(12) United States Patent
Ngan et al.

(10) Patent No.: US 9,251,829 B2
(45) Date of Patent: Feb. 2, 2016

(54) HEAD DFH PROTRUSION SHAPE CALIBRATION BY HDI SENSOR

(75) Inventors: Siu Yin Ngan, Fremont, CA (US); Qinghua Zeng, Fremont, CA (US); Ellis Cha, San Ramen, CA (US)

(73) Assignees: SAE Magnetics (HK) Ltd., Shatin, N.T. (HK); Headway Technologies, Inc., Milpitas, CA (US)

(*) Notice: Subject to any disclaimer, the term of this patent is extended or adjusted under 35 U.S.C. 154(b) by 260 days.

(21) Appl. No.: 13/317,402

(22) Filed: Oct. 17, 2011

(65) Prior Publication Data
US 2013/0094104 A1 Apr. 18, 2013

(51) Int. Cl.
*G11B 5/60* (2006.01)
*G11B 27/36* (2006.01)

(52) U.S. Cl.
CPC .............. *G11B 5/607* (2013.01); *G11B 5/6011* (2013.01); *G11B 5/6029* (2013.01); *G11B 5/6076* (2013.01); *G11B 27/36* (2013.01); *G11B 2220/2516* (2013.01)

(58) Field of Classification Search
CPC .......... G11B 5/48; G11B 5/60; G11B 5/6011; G11B 5/6029; G11B 5/607; G11B 5/6076
USPC ........... 360/31, 63, 71, 75, 97.12, 97.19, 230, 360/234, 234.3
See application file for complete search history.

(56) References Cited

U.S. PATENT DOCUMENTS

| | | | | |
|---|---|---|---|---|
| 7,468,854 B2 * | 12/2008 | Yamashita | ............ | G11B 5/6005 360/31 |
| 7,492,543 B2 * | 2/2009 | Mitsunaga | ............ | G11B 5/6005 360/75 |
| 7,817,372 B2 * | 10/2010 | Takahashi | ............ | G11B 5/6005 360/31 |
| 7,903,365 B2 | 3/2011 | Watanabe | | |
| 8,773,801 B2 * | 7/2014 | Kurita | ................... | G11B 5/6076 360/55 |
| 2006/0056094 A1 * | 3/2006 | Fu | ........................ | G11B 5/6064 360/75 |
| 2006/0285248 A1 * | 12/2006 | Pust | ...................... | G11B 5/3116 360/128 |
| 2008/0043363 A1 * | 2/2008 | Yamashita | ........... | G11B 5/6005 360/75 |
| 2009/0251828 A1 * | 10/2009 | Schreck | ................. | B82Y 10/00 360/319 |
| 2009/0310262 A1 * | 12/2009 | Wu | ......................... | G11B 5/11 360/319 |
| 2010/0097721 A1 | 4/2010 | Baumgart et al. | | |
| 2011/0235208 A1 * | 9/2011 | Yang | ..................... | G11B 5/6005 360/75 |
| 2012/0300334 A1 * | 11/2012 | Hsiao | ..................... | G11B 5/607 360/59 |

\* cited by examiner

*Primary Examiner* — Thomas Alunkal
(74) *Attorney, Agent, or Firm* — Saile Ackerman LLC; Stephen B. Ackerman

(57) ABSTRACT

Dynamic fly height (DFH) controlled read/write heads using multiple heaters have their heater powers set within a range of ratios that allows minimum clearances to be set between the read-gap and the write-gap and the surface of a disk, thereby providing improved touch-down detection. Determining the correct range of power ratios requires varying the ratio to create an adjustable protrusion profile for the read and write elements in the head and measuring values of the ratio and corresponding values of read gap and write gap clearances that create points of minimum clearance. By adjusting the ratio of power supplied to the heaters, different protrusion profiles can be produced, clearance control for sigma reduction can be obtained and read/write readiness and operation consistency and reliability can be improved.

32 Claims, 3 Drawing Sheets

HEAD DFH PROTRUSION SHAPE CALIBRATION BY HDI SENSOR

BACKGROUND OF THE INVENTION

1. Field of the Invention

This invention relates to the fabrication of hard disk drives (HDD), particularly to a method of measuring head protrusion in a slider produced by the controlled use of heater elements.

2. Description of the Related Art

As magnetic read/write heads have been required to deal with magnetic media having increasingly higher area density of recorded information, various methods have been developed to improve the capabilities of the head to read and write at those levels. Traditionally, the direction taken in trying to achieve the reading and writing of this high density information has been to decrease the spacing (i.e. the static fly height) between the disk and the slider in each new generation of products.

FIG. 1 is a schematic illustration showing a single suspension-mounted slider (the combination collectively termed a "head gimbals assembly (HGA)") positioned above a rotating magnetic hard disk during disk-drive operation in a hard disk drive (HDD) at ambient operating temperature. The suspension (101) holds the slider (10) at an angle above the surface of the spindle-mounted magnetic disk (400), producing a static "fly height" between the air bearing surface (ABS) (100) of the slider and the disk. A read/write head (600) is mounted within the slider. The rotation of the disk (400) is, by definition, into the leading edge of the slider, while the read/write head (600) is located at the trailing edge of the slider. The write-gap (from which the write magnetic field contacts the disk) of the head (90) is "above" (i.e. to the trailing edge side of) the read-gap portion (30). The hydrodynamics of the air layer between the ABS and the rotating disk surface supports the slider at a static fly height above the disk. In the two-heater dynamic flying height (DFH) type of system to be discussed herein, separately controllable heater elements (35), (95) are located adjacent to the two gaps (30) and (90) and, by heating the region surrounding the gaps, can cause protrusions (not shown) of the ABS (200) of the head portion relative to the undisturbed shape of the ABS. These protrusions will produce a characteristic shape (the protrusion profile) across the ABS, which will manifest itself in a corresponding profile of the flying height of the ABS above the disk (the flying height profile).

Although FIG. 1 illustrates one dual-heater DFH head, single-heater heads are common and multi-heater heads with more than two heaters can also be envisioned. It is further noted that hard disk drives (HDD) in the current art will typically include a plurality of adjacent, independently operating suspension mounted sliders exactly as shown in FIG. 1, each located adjacent to its own disk, which are mounted in a stack configuration. Although such an arrangement is not illustrated herein, it is easily visualized.

The limit of the total clearance budget (i.e. the sum of all factors entering into the total clearance between the head and the disk) prohibits a continuous reduction of this static fly height beyond a certain point. In addition to the static fly height variations resulting from the ABS and HGA/HSA (head gimbal assembly/head stack assembly) manufacturing processes, other factors also contribute to the total clearance between the head and the disk. A simple example is the drop in static fly height when the HDD is moved from sea level to a higher altitude. Yet another example is the isothermal PTP (pole tip protrusion) associated with the change in ambient temperature of the environment in which the HDD is located. Furthermore, the writer coil induced PTP (protrusion caused by joule heating of the coil) also diminishes the fly height clearance when the coil is activated to produce magnetic flux in a HDD write operation. There is a clear necessity to have a method of producing DFH (dynamic fly height) control, i.e. a method of providing a controllable head-disk spacing under various operational conditions, to avoid incidental contacts between the head and the disk that result from these inevitable variations in static fly height.

A common prior art approach to introducing such a "dynamic" control of fly height spacing is to embed a thin layer of heater film inside the magnetic recording head to produce single or multiple heater elements. The heater film is electrically connected to the pre-amplifier within which a heater current is activated to increase the heater film temperature and, thereby, to increase the temperature of the surrounding materials of the head structure. When subjected to this increased temperature, the materials forming the head begin to expand in accordance with their respective thermal expansion characteristics. This leads to a thermally deformable ABS and a resulting protrusion profile that achieves a lower spacing (less clearance) between the disk surface and the RG (read gap) and WG (write gap), thus greatly improving head performance.

When the read/write operation is not required, the heater current is turned off so that the ABS is elastically returned to its original, non-deformed state. The induced rise in temperature produced by the heating is sufficiently mild that the reliability of the head is not detrimentally affected. In addition, the heater activation has not shown a degrading effect on the magnetic reader in terms of noise and stability, since the magnetic fields produced by the heater activation currents is minimal.

The utilization of the DFH heater (or heaters) shows an unequivocal improvement in HDD performance. However, the same DFH power setting cannot be expected to deliver the same changes in spacing for each individual head due to the inevitable variations in the manufacturing process.

Single heater induced head element protrusion height is proportional to heater power and there is a fixed protrusion profile shape. Referring to FIG. 2, there is shown, schematically, a protrusion profile produced by a single heater as a function of distance along the ABS measured in microns from the edge (at x=0) between the alumina of the head element and the slider substrate edge (see (600) in FIG. 1). Different heater powers are shown, ranging from a low of 20 mW (milliwatts) (20) to a high of 100 mW (100). Each profile has a similar shape, displaying a flat region between the location of the read-gap and the write-gap and gradual increase and decrease in the protrusion to either side of the flat region. Typically the head element also includes a head-disk interference (HDI) sensor. This sensor is a resistive temperature sensor used to detect a temperature change in the head that is induced by changes in clearance during head vibrations caused by contact with disk asperities. In the single heater DFH, the head element flying profile is fixed between DFH touch-down and the flying operation.

Referring to FIG. 3, there is shown, schematically, a flying height profile graph with a single heater DFH, in which the height of the head above the medium (the ordinate) is measured in nanometers (nm) and length along the ABS of the head (abscissa) is measured in microns, exactly as in FIG. 2. The upper graph (5), representing a condition of no DHF (no heater activation), shows the passive flying height of the read gap and write gap above the medium surface. The lower graph, broken line (7), shows the effects of activating DFH during operation, which, in the case of a single heater, produces a fixed protrusion shape whose height above the medium is proportional to the power supplied to the single heater. Since the head touch-down point and the operational minimal fly height point are the same and cannot be adjusted, DFH touch-down detection and operational read-gap and write-gap clearances cannot be optimized. The solid line (9) beneath the broken line (7) shows the head touch-down used to calibrate the touch-down DFH power and to determine the operational DFH power. Due to the effects of head manufacturing tolerances on passive flying height and pole tip recession (PTR), head element DFH touch-down locations will be tolerated. This affects the head touch-down vibration and DFH touch-down detection by HDD or HDI sensor. Moreover, read gap and write gap clearances associated with variations in head element TD locations are also tolerated.

Referring to FIG. 4, there is shown a histogram of flying height (FH) clearance differences ("deltas"), defined as read-gap fly height (RG/FH) minus write-gap fly height (WG/FH), (delta=RG/FH−WG/FH) between read-gaps and write-gaps and the medium surface during touch-down and head flying operation. Not unexpectedly, the histogram is well represented by a Gaussian curve and shows that the greatest number of read/write heads show a clearance difference of 1.0 nm.

This distribution of clearance differences in single heater DFH that results from normal manufacturing tolerances directly affects the magnetic performance or recording density due to the variation in magnetic spacing between the reader and the disk. Read-gap and write-gap operation clearance sigma (standard deviations) would be increased by the touch-down detection error and head manufacturing tolerances (eg. PTR tolerances). Moreover, the distribution also exacerbates head vibration inconsistencies during DFH touch-down, causes HDI sensor touch-down detection error and ultimately affects head reliability.

To improve the operation clearance sigma and the HDI sensor touch-down detection accuracy, an adjustable DFH protrusion shape can be applied to the head element through multi-heater fly height (DFH) control or other features. Although such adjustable DFH protrusion shape is available, there is no methodology to calibrate suitable DFH protrusion shapes in order to obtain data necessary for establishing read and write gap clearances, to optimize the write-gap clearance, during reading, for $1^{st}$ sector writing readiness, and to have a consistent level of DFH touch-down vibration.

To achieve the required improvement of DFH head performance, an effective calibration methodology of a variable DFH protrusion is a necessity. Although the following prior arts have considered aspects of these problems, they have not considered aspects addressed by the present invention nor have they arrived at the solution method of the present invention.

U.S. Pat. No. 7,492,543 (Mitsunaga et al) discloses a method to measure heater control values for each head. A clearance control unit varies electric power distribution to a heater to vary the protrusion value of the head to control the clearance.

U.S. Pat. No. 7,903,365 (Watanabe) teaches that clearances between the ABS surfaces and magnetic heads can be adjusted by respective heaters. A vibration detection sensor is disclosed.

U.S. Pat. No. 7,817,372 (Takahashi) shows a flying height control method including measuring saturation characteristics and adjusting flying height based on the measurements.

U.S. Pat. No. 7,468,854 (Yamashita et al) describes accurate measurement of flying height by controlling power distribution to the heaters in the heads.

SUMMARY OF THE INVENTION

A first object of the present invention is to provide a method of calibrating a variable dynamic fly height (DFH) protrusion shape.

A second object of this invention is to use the calibration method to better control the effects of variations in read-gap and write-gap clearances and to use such control, for example, to optimize read-gap and write-gap clearances for $1^{st}$ sector write and read readiness.

A third object of the present invention is to use the calibration method to provide improved HDI sensor touch-down sensitivity and, consequently, improved touch-down detection consistency, particularly in a head with multi-heater protrusion shape control.

A fourth object of the present invention is to apply the calibration method and the control it provides to a set of DFH read/write heads used in a HDD.

A fifth object of the present invention is to provide a HDD using the heads that are so calibrated and controlled.

The objects of this invention will be achieved by use of multiple heat producing elements (heaters) within a DFH read/write head (and a HDD including at least one of such heads, but typically including a multiplicity of heads and associated disks) whose separate and controlled activation can create a variety of ABS protrusion profiles. By further equipping the head (or HDD) with a vibration sensor or equivalent sensing device or by employing an alternative method to measure profiles, such as read-back signals themselves, head/disk clearances can be determined and touch-down events can be detected. Note, for simplicity, the example below assumes a dual heater structure as shown in FIG. 1, but an extension to more than two heaters is easily visualized.

Controlling the ratio of the power supplied to these two exemplary heaters provides an adjustable DFH protrusion profile shape whose effects can be determined, calibrated and, thereby, advantageously controlled. One example of the use of this control is to address the $1^{st}$ sector write issue (writing at the initial portion of a sector), which can be done as follows. When the drive is conducting a read operation, read-gap (RG) clearance should be minimized for best performance. This is done using a power ratio setting in accord with the calibration of the method. Just before the drive switches over to a write mode, however, it is advantageous to decrease the write-gap (WG) clearance slightly to prepare for the write operation. This, too, is done within the parameters set by the calibration. After switching to write mode, the decreased WG clearance can achieve target clearance faster and eliminate the $1^{st}$ sector write issue. An additional advantage of the shape control is that touch-down detection accuracy is improved and, as a consequence, touch-down detection consistency is enhanced. The method of producing the calibration and control will be described below with reference to the preferred embodiment.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein.

DESCRIPTION OF THE PREFERRED EMBODIMENT

The preferred embodiment of the present invention teaches a method of calibrating flying height profiles of the protrusion shapes of a multi-heater DFH read/write head in a multi-head hard disk drive and subsequently using the calibration (or those calibrations) to control the performance of the multi-heater DFH read/write head to improve its performance and reliability. Correspondingly, a set of such calibrated and controllable heads can be used to advantage in a hard disk drive (HDD).

The method includes establishing a relationship between signals sent by a HDI touch-down sensor (or its equivalent) in a dual-heater (or multi-heater) DFH read/write head (or a set of such read/write heads) and various DFH protrusion shapes of the head ABS. These shapes are formed by the activation of the heaters in the body of the DFH read/write head under a range of power ratios.

Controlling the ratios of the power supplied to these heaters (done separately for each head/disk of said set of heads/disks) creates an adjustable DFH protrusion profile shape. By the use of this control and a calibration associated with it, for example, one can address the $1^{st}$ sector write issue in the following manner. When the drive is conducting a read operation, read-gap (RG) clearance should be minimized for best performance. Just before the drive switches over to a write mode, it is advantageous to decrease the write-gap (WG) clearance slightly to prepare for the write operation. After switching to write mode, the decreased WG clearance can achieve target clearance faster and eliminate the $1^{st}$ sector write issue. The details of the control and calibration associated with the method will now be described using the following dual-heater example.

Figure 1:
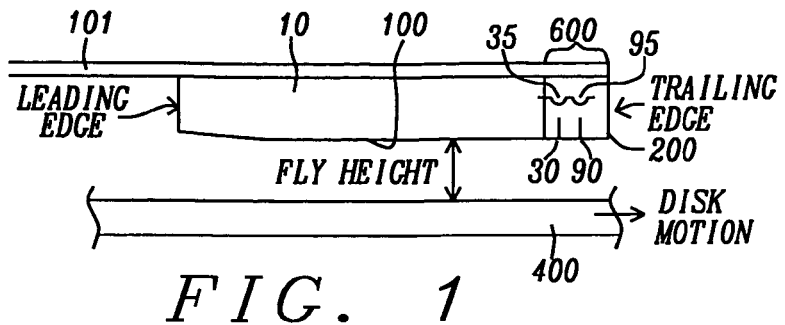
FIG. 1 is a schematic side view of a suspension mounted prior art slider showing the magnetic spacing between the slider and a disk surface during normal operating conditions.
Figure 2:
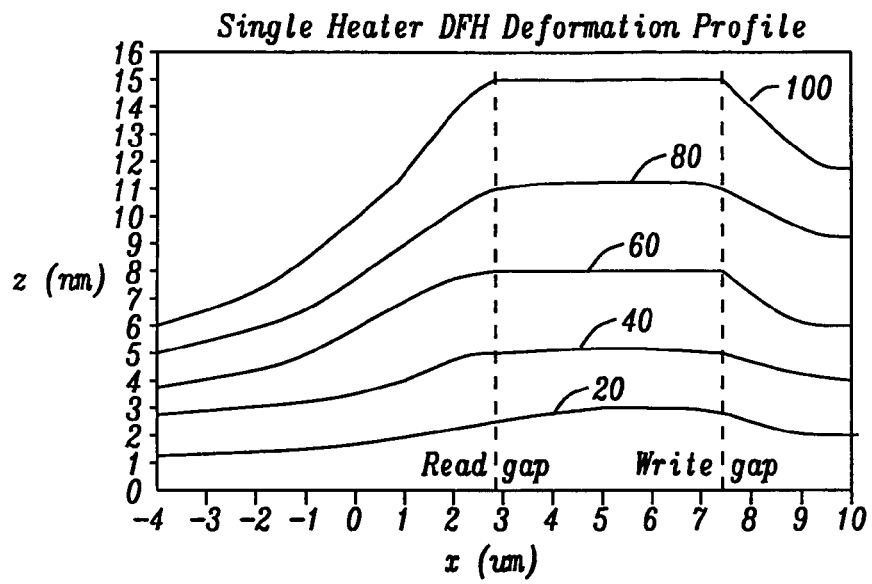
FIG. 2 is a graphical representation showing schematic deformation profiles resulting from the activation, at various energies, of a single heater in a DFH read/write head.
Figure 3:
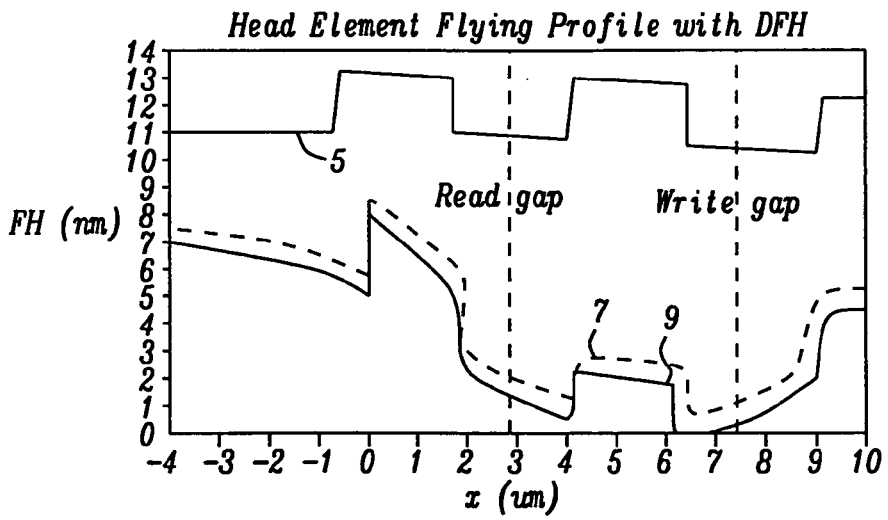
FIG. 3 is a graphical representation showing a schematic flying height profile for a single heater DFH read/write head when the heater is not activated and when the heater is activated.
Figure 4:
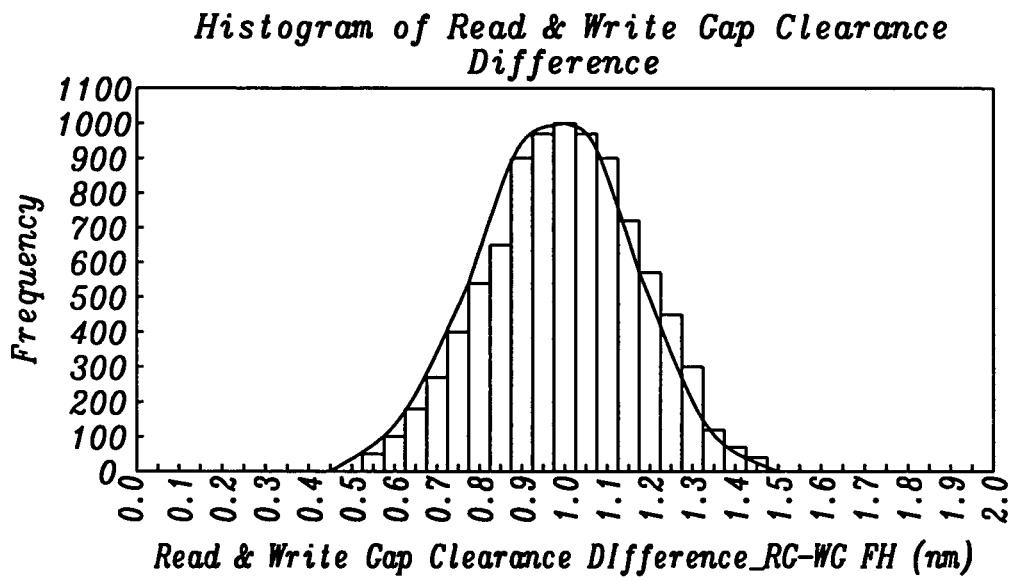
FIG. 4 is a graphical representation showing a histogram of read-gap and write-gap clearance differences resulting from variations within manufacturing tolerances.
Figure 5:
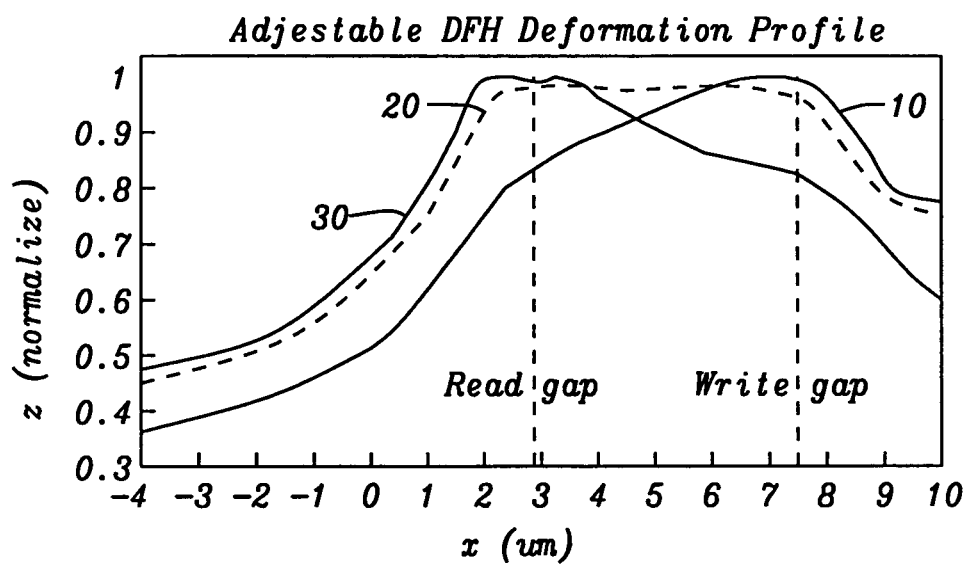
FIG. 5 is a graphical representation showing schematic deformation profiles resulting from the activation of each heater in a dual-heater DFH read/write head.

For the case of a dual heater DFH head (as shown in FIG. 1), one heater, denoted $H_r$, is placed adjacent to the read gap and a second heater, denoted $H_w$, is placed adjacent to the write gap. Referring now to FIG. 5, there are shown three graphs illustrating the effects of applying power to each of the heaters. The abscissa of the graph indicates distance along the ABS of the head measured in microns from the boundary (x=0) between the head and the slider substrate (see (600) in FIG. 1). The ordinate of the graph is the height of the protrusion, in normalized units. The positions of the read gap and write gap are indicated by vertical lines at approximately 3 and 7.5 microns.

When power is supplied only to heater $H_w$, the protrusion profile shape labeled DFH_1 (10) is obtained. When power is supplied only to heater $H_r$, the profile labeled DFH_3 (30) is obtained. When power is supplied to both heaters, the profile shape DFH_2 (20) is obtained. Different shapes of DFH_2 will be obtained by supplying different amounts of power to $H_r$ and $H_w$. To investigate the relationship between the protrusion profile DFH_2 and head element touch-down vibration magnitude (as measured by the HDI sensor), we conduct touch-down tests to measure the HDI sensor signal as a function of DFH power ratio (the ratio of power supplied to the two heaters). At the same time, the head element flying profile is monitored and shown in FIG. 6.

Figure 6:
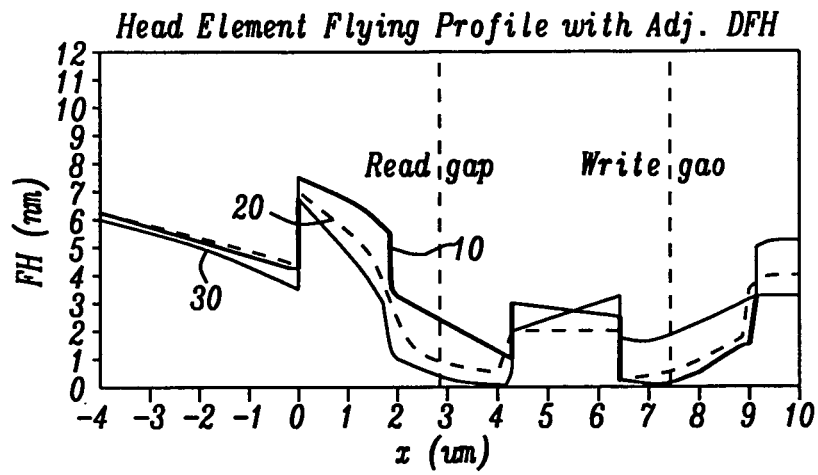
FIG. 6 is a graphical representation showing the schematic flying height profile of a dual-heater DFH read/write head when each heater is separately activated and when both are activated.

Referring to FIG. 6, there are shown three overlapping graphs, the abscissa being the same as in FIG. 5, but the ordinate now measuring flying heights in nanometers (nm) above the surface of the medium. Each of the three graphs shows a flying height profile under a specific heater condition, i.e. the results of measuring the flying height along portions of the read/write head, under that specific condition (see also FIG. 5 for the same three conditions).

Graph (10) shows the flying height profile for the head labeled DFH_1 (also in FIG. 5), indicating activation of the write head heater only. Graph (30) shows the flying height profile for the head labeled DFH_3, indicating activation of the read head heater only. Graph (20) shows the flying height profile for head labeled DFH_2, indicating the activation of both heaters. The location of the read-gap and write-gap are indicated by vertical broken lines at approximately 3 microns and 7.5 microns respectively. Each of the flying height profiles shown schematically is determined by the initial pole-tip recession (PTR) profile (PTR step-delta between the write-gap and the read-gap under ambient conditions) and DFH_2 (20). To achieve the same flying profile for all samples, we must separately adjust the power ratio for each sample in the set in order to compensate for manufacturing variations in the PTR step-delta.

Figure 7:
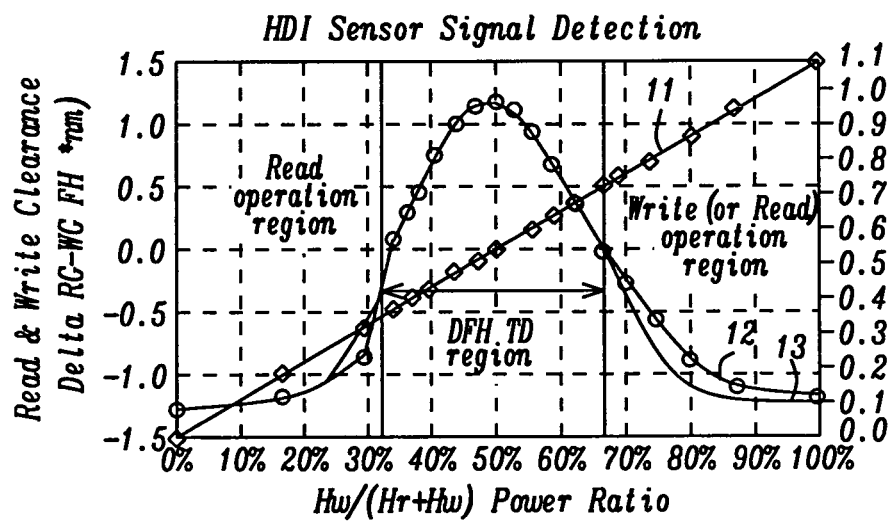
FIG. 7 is a graphical representation showing the correlation between signals generated by a HDI sensor and the differences between read gap and write gap fly heights (clearances) under a range of power ratios supplied to each heater in a dual heater DFH head.

Referring now to schematic FIG. 7, there is shown the results of recording the HDI sensor signal while both heaters are operating, but while the ratio of the power to the heaters is being varied. The abscissa of the graph is a representation of the power ratio: $H_w/(H_r+H_w)$. Thus the 0% value indicates no power is being supplied to the heater $H_w$ adjacent to the write-gap (the read operation region), while the 100% value indicates no power is being supplied to the heater $H_r$ adjacent to the read-gap (the write operation region). The left side ordinate plots (in nanometers) the difference (delta) in flying heights (RG/FH−WG/FH) between the read-gap and write-gap. The right side ordinate plots a normalized value of the HDI sensor signal. The dashed straight line (11) plots the difference (delta) in read gap and write gap flying heights as a function of power ratio. At 0% power to the write gap heater, delta is negative, indicating that the write gap is flying higher than the read gap. At 100% power to the write gap heater, delta is positive, indicating that the read gap is flying higher than the write gap.

The measured HDI sensor signal (12) (fit smoothly by curve (13)) forms a Gaussian shaped response as a function of the power ratio, indicating that the maximum interference occurs when the power ratio is 50%. This value also corresponds to the same clearance for both the read and write gaps (or shields/contact pads) as indicated by straight line (11). The head touch-down vibration measured by the HDI sensor is strongest when both the read and write gaps contact the medium (a two-point touch-down). However, within the DFH TD (DFH touch-down) region, between approximately 32% and 65% power ratio (−0.5 nm to +0.5 nm RG/FH−WG/FH delta), the HDI signal is sufficiently strong to indicate that touch-down is occurring. Looking at both ends of the Gaussian curve (12), it is seen that the HDI sensor signal flattens out when the delta is larger than 1 nm (in absolute value). This test shows that the HDI sensor signal can detect read and write gap clearances by the head element touch-down vibration generated by different DFH protrusion shapes. The same results are obtained under various environmental conditions of temperature, humidity and pressure.

We conclude from these results that the HDI sensor signal response of the DFH touch-down characteristics with different DFH protrusion shapes can be used to calibrate the DFH protrusion shape and to control read and write gap clearances in the hard disk drive (HDD). This will contribute to the reduction or elimination of DFH touch-down detection error and read and write gap clearance sigma that characterizes head reliability and performance. It also contributes to the control of read-gap and write-gap clearances for $1^{st}$ sector writing or reading readiness, as discussed previously. For each head (and its associated disk) in a HDD, a DFH touch-down calibration can be conducted with different read and write gap clearance deltas by DFH protrusion shape control, or tested with different DFH heater power ratios. DFH protrusion shape with maximum HDI sensor signal output is the target shape for DFH touch-down detection. Obtaining the target shape will then contribute to the reduction of DFH touch-down detection error resulting from insufficient touch-down vibration due to variations that are still within manufacturing tolerances. Moreover, this target DFH protrusion shape achieves the result that both the read-gap and the write-gap (or shields/contact pads) have the same clearances with respect to the medium. It is, therefore, the role of the target profile data to control read-gap and write-gap clearances for operation. It also reduces read-gap and write-gap operation clearance sigma caused by the variations that fall within manufacturing tolerances. In addition, the signals generated by the HDI sensor change with relative clearances of the read-gap and write-gap. Thus, the HDI sensor signal can be used to measure read and write gap clearance differences in a DFH touch-down. We further note that these tests and the resulting calibrations can be advantageously carried out for different operating conditions that a HDD may be expected to experience. Thus, the calibrations can be carried out for variations of ambient temperatures, humidities, altitudes, etc. Once the calibrations are obtained, the power ratios for the HDD (all heads and associated disks) can be properly set as needed.

To summarize the above, we have assumed two heaters (although an extension to more than two heaters can be visualized), the first receiving power in the amount $H_r$ and situated adjacent to the read-gap, the second receiving power in the amount $H_w$ and situated adjacent to the write-gap. We further assumed a controllable ratio of the power supplied to the heaters, the ratio being of the form $H_w/(H_r+H_w)$. Varying this power ratio between 0% and 100% will produce a corresponding range of flying height profiles in which touch-downs and near touch-downs will occur as a result of separate approaches by the read gap and write gap and by the both gaps together.

An HDI sensor embedded in the read/write head detects vibrations of the head resulting from the clearance between the head and the rotating medium and sends a recordable signal indicating the intensity of these vibrations. Alternatively, a read-back signal from the head itself can also be used to measure vibrations and can replace the HDI sensor.

The power ratio that produces the highest level of vibration, which can be found by interpolation, as in FIG. 7, is used as a reference and datum. After the point of greatest vibration is determined, the power ratio can be adjusted to achieve a sufficiently strong vibration to enable accurate touch-down detection. During the touch-down detection, the clearance difference (delta) between read-gap and write-gap (or shields/contact pads) can be within a +/−0.5 nm range that gives a strong vibrational signal. Thus, during read and write operations the power ratio can be adjusted so that the strong vibrational region is avoided. In this way, the effects of variations due to normal manufacturing tolerances are eliminated.

As is understood by a person skilled in the art, the preferred embodiment of the present invention is illustrative of the present invention rather than being limiting of the present invention. Revisions and modifications may be made to methods, processes, materials, structures, and dimensions through which a multi-heater DFH head is calibrated so that a power ratio between separate heaters can be set, while still providing such methods, processes, materials, structures and dimensions in accord with the present invention as defined by the appended claims.

What is claimed is:

1. A method for calibrating and operating a dynamic flying height (DFH) controlled read/write head comprising:
   providing a hard disk drive (HDD) having a rotatable disk therein;
   providing a DFH controlled read/write head, said head or said HDD having a head-disk interference (HDI) sensor incorporated therein and said head having at least a first and second heater element, wherein said first heater element is located adjacent to a write gap and said second heater element is located adjacent to a read gap, wherein said read/write head is flyable above said rotating disk; then, while
   supplying power to said at least first and second heaters at a variable and controllable ratio, and, utilizing feedback produced by said HDI sensor, producing, thereby, corresponding protrusion profiles;
   measuring a clearance between a point on an ABS of said read/write head closest to said rotating disk for each of said protrusion profiles; then
   determining a reference ratio at which a protrusion profile producing a minimum clearance is attained; and
   determining a range of ratios about said reference ratio at which measurable minimal acceptable clearances are obtained; then
   setting a ratio within said range and operating said read/write head at that ratio;
   whereby said ratio also allows optimization of read-gap and write-gap clearances in preparation for switching between a reading and writing operation.

2. The method of claim 1 wherein a read-gap clearance is minimized immediately prior to a read operation and then, during the read operation, but just prior to a subsequent write operation, a write-gap clearance is reduced.

3. The method of claim 1 wherein said measuring of a clearance is accomplished by sensing vibrations of said read/write head from read-back data.

4. The method of claim 1 wherein said power ratio is $H_w/(H_r+H_w)$, where $H_w$ is the power supplied to said first heater adjacent to said write gap and $H_r$ is the power supplied to said second heater adjacent to said write gap.

5. The method of claim 1 wherein supplying said power at said variable ratios creates corresponding variable protrusion profiles of said ABS.

6. The method of claim 1 wherein said range of measurable minimal acceptable clearances includes differences in clearance between said read-gap and said write-gap of approximately +/−0.5 nm.

7. The method of claim 1 wherein said range of acceptable clearances is chosen so that during normal write operations the read-gap clearance is at least 0.5 nm higher than said write gap clearance.

8. The method of claim 1 wherein said range of acceptable clearances is chosen so that during normal read operations the write-gap clearance is at least 0.5 nm higher than said read-gap clearance.

9. The method of claim 1 wherein said range of acceptable ratios include profiles that do not cause excessive vibrations.

10. The method of claim 1 wherein said minimum clearance point is obtained by means of interpolation of data forming said ratio vs. clearance graph.

11. The method of claim 1 wherein said range is set to accommodate variations in ambient operating conditions including temperature, humidity and altitude.

12. The method of claim 1 wherein said range is set independently at the initiation of a write operation to allow a decrease in write gap flying height and at the termination of said write operation to allow a decrease in read gap flying height, by creating optimum flying height profiles for each said operational positions.

13. A method for calibrating a set of dynamic flying height (DFH) controlled read/write heads for use in a multi-head hard disk drive (HDD) comprising:
    providing a hard disk drive (HDD) having at least one rotatable disk therein;
    providing a set of DFH controlled read/write heads, wherein said HDD or wherein each read/write head in said set has a head-disk interference (HDI) sensor incorporated therein and wherein each read/write head has at least a first and second heater element, wherein said first heater element is located adjacent to a write gap and said second heater element is located adjacent to a read gap, wherein each said read/write head is flyable above one of at least said one rotating disk; then
    selecting a first read/write head from said set; then, while supplying power to said at least first and second heaters of said first read/write head at a variable and controllable ratio, and, utilizing feedback produced by said HDI sensor, producing, thereby, corresponding protrusion profiles;
    measuring a clearance between a point on an ABS of said read/write head closest to said rotating disk for each of said protrusion profiles; then
    determining a reference ratio at which a protrusion profile producing a minimum clearance is attained; and
    determining a range of ratios about said reference ratio at which measurable minimal acceptable clearances are obtained; then
    setting a ratio within said range and operating said first read/write head at that ratio.

14. The method of claim 13 wherein said ratio allows optimization of read-gap and write-gap clearances in preparation for a switch between a reading and writing operation.

15. The method of claim 14 wherein a read-gap clearance is minimized immediately prior to a read operation and then, during the read operation, but just prior to a subsequent write operation, a write-gap clearance is reduced.

16. The method of claim 13 wherein said measuring of a clearance is accomplished by sensing vibrations of said read/write head from read-back data.

17. The method of claim 13 wherein said power ratio is $H_w/(H_r+H_w)$, where $H_w$ is the power supplied to said first heater adjacent to said write gap and $H_r$ is the power supplied to said second heater adjacent to said write gap.

18. The method of claim 13 wherein supplying said power at said variable ratios creates corresponding variable protrusion profiles of said ABS.

19. The method of claim 13 wherein said range of measurable minimal acceptable clearances includes differences in clearance between said read-gap and said write-gap of approximately +/−0.5 nm.

20. The method of claim 13 wherein said range of acceptable clearances is chosen so that during normal write operations the read-gap clearance is at least 0.5 nm higher than said write gap clearance.

21. The method of claim 13 wherein said range of acceptable clearances is chosen so that during normal read operations the write-gap clearance is at least 0.5 nm higher than said read-gap clearance.

22. The method of claim 13 wherein said range of acceptable ratios include profiles that do not cause excessive vibrations.

23. The method of claim 13 wherein said minimum clearance point is obtained by means of interpolation of data forming said ratio vs. clearance graph.

24. The method of claim 13 wherein said range is set to accommodate variations in ambient operating conditions including temperature, humidity and altitude.

25. The method of claim 13 wherein said range is set independently at the initiation of a write operation to allow a decrease in write gap flying height and at the termination of said write operation to allow a decrease in read gap flying height, by creating optimum flying height profiles for each said operational positions.

26. A hard disk drive (HDD) including a calibrated dynamic flying height (DFH) controlled read/write head comprising:
    a HDD having at least one rotatable disk therein;
    a DFH controlled read/write head associated with said at least one rotatable disk, wherein said read/write head has at least a first and second heater element, wherein said first heater element is located adjacent to a write gap and said second heater element is located adjacent to a read gap, wherein said read/write head is flyable above said rotating disk;
    a head-disk interference (HDI) sensor or its equivalent for measuring clearances and determining touch-downs between said read/write head and said rotating disk;
    a variable and controllable power ratio that is capable of being applied to at least said first and second heater element in said read/write head, wherein, when combined with feedback from said HDI sensor, said power ratio produces a corresponding protrusion profile of said write head;
    using said protrusion profile a range of said variable and controllable power ratios is determined for said read/write head within which range said HDI sensor or its equivalent provides signals indicating the onset of touch-downs and, correspondingly, minimal acceptable clearances between said read/write head and said rotating disk;

a power ratio within said range applied to said read/write head whose value assures a reliable DFH control of said read/write head without the occurrence of touch-down events;

whereby said power ratio also allows optimization of read-gap and write-gap clearances in preparation for switching between a reading and writing operation.

27. The HDD of claim 26 wherein said determination of touch-downs is accomplished by sensing vibrations of said read/write head from read-back data.

28. The HDD of claim 26 wherein said range of measurable minimal acceptable clearances includes differences in clearance between said read-gap and said write-gap of approximately +/−0.5 nm.

29. The HDD of claim 26 wherein said range of acceptable clearances is chosen so that during normal write operations the read-gap clearance is at least 0.5 nm higher than said write gap clearance.

30. The HDD of claim 26 wherein said range of acceptable clearances is chosen so that during normal read operations the write-gap clearance is at least 0.5 nm higher than said read-gap clearance.

31. The HDD of claim 26 wherein said range of acceptable ratios include profiles that do not cause excessive vibrations.

32. The HDD of claim 26 wherein said range is set to accommodate variations in ambient operating conditions including temperature, humidity and altitude.

* * * * *